Dec. 31, 1940.  J. E. NEALE ET AL  2,226,907
GAS OVEN
Filed May 31, 1939   2 Sheets-Sheet 1
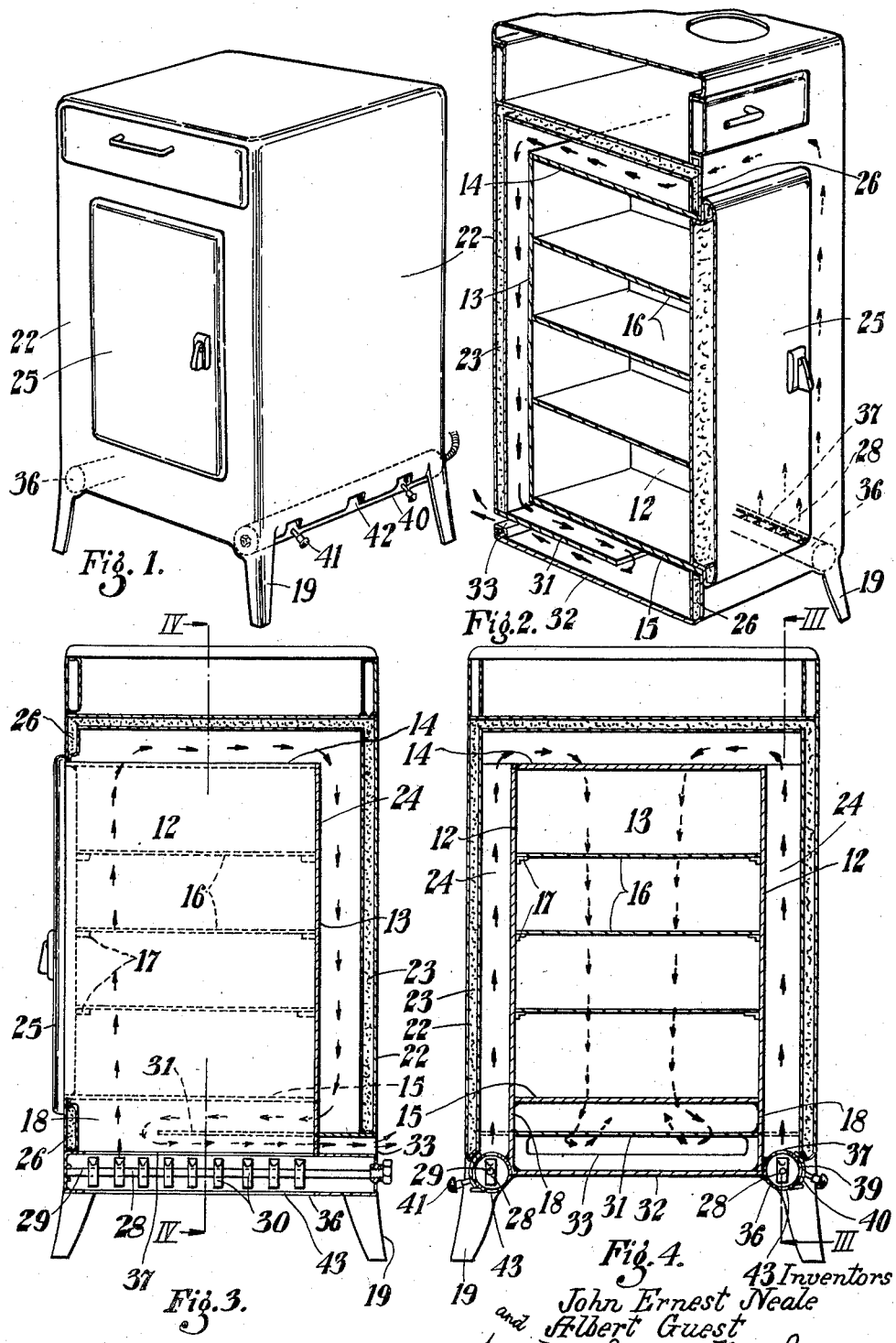
Inventors
John Ernest Neale
and Albert Guest
by Mawhinney & Mawhinney
Attorneys Patented Dec. 31, 1940

2,226,907

UNITED STATES PATENT OFFICE 2,226,907

GAS OVEN

John Ernest Neale and Albert Guest, Coventry, England

Application May 31, 1939, Serial No. 276,726
In Great Britain April 3, 1939

1 Claim. (Cl. 126—39)

This invention relates to gas ovens, and particularly to such as are to be used for cooking foodstuffs, though the invention is not limited in this respect.

One object of the invention is to provide for a very even distribution of heat throughout the oven, so that, in ordinary conditions, it will be unnecessary for a cake or other foodstuff which is being cooked to be turned periodically.

A further object is to prevent the possibility of the burnt gases coming in contact with any foodstuff being cooked in the oven.

A still further object of the invention is to provide a gas oven which includes a closed chamber (openable at the front in the ordinary way) encircled at the sides at least, preferably over substantially the whole width thereof, by heating passages along which heated gases can be passed, to an outlet, from one or more burner units, the whole being lagged or otherwise heat-insulated as necessary. Preferably the heated gases are also arranged to pass along passages at the back, top and/or bottom of the chamber.

For a better understanding of these and other objects and advantages of the invention attention should be directed to the following description in which reference is made to the accompanying drawings, wherein:

Figure 1 is a perspective view of one form of gas cooker arranged according to the invention;

Figure 2 is a sectional perspective view thereof from the other side, to a slightly larger scale, the section being taken through the oven door;

Figure 3 is a sectional elevation thereof, also to a larger scale, on the line III—III of Figure 4;

Figure 4 is a sectional elevation thereof on the line IV—IV of Figure 3;

Like reference characters are used as far as possible to designate similar parts throughout the drawings.

Figure 5:
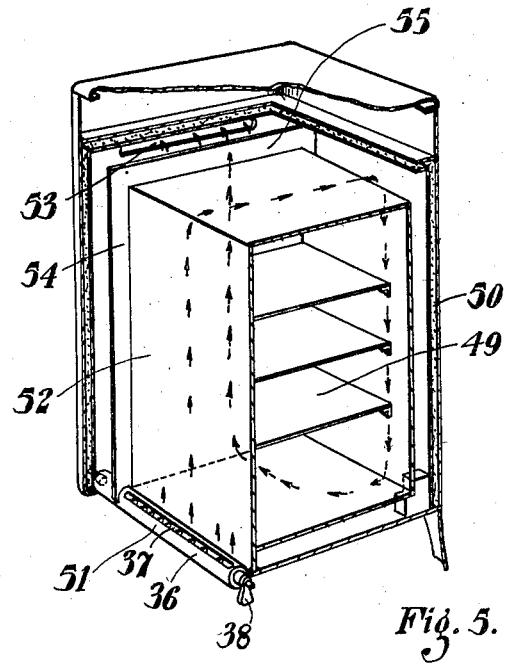
Figure 5 is a sectional perspective view illustrating a modified form of gas oven according to the invention.

In the construction of Figures 1 to 4, the oven chamber is of substantially square form in front elevation. It includes a pair of side walls 12, a back wall 13, a top wall 14, and a bottom wall 15. 16 indicates a plurality of removable shelves in its interior supported from ledges 17. The side walls extend below it at 18 to rest on a support which includes feet 19. The chamber is encircled by a casing 22 spaced from the sides, top, bottom and back thereof, and the casing is lagged as necessary, as indicated at 23. The back wall of the chamber is extended at the sides, as shown at 24, as far as the sides of the casing.

A hinged door or other closing means 25 for the open front of the chamber may be arranged also to coact with the front edge of the casing as shown, but preferably the space between the casing and the chamber is permanently covered in at the front, as indicated at 26 in Figures 2 and 3.

In the present instance we provide two burner units 28 respectively outside the lower extending portions 18 of the side walls of the chamber and in the spaces between these side walls and the adjacent walls of the casing. Each burner unit preferably includes a pipe 29 to which gas can be supplied, the pipe having a number of individual burners 30 spaced along it and arranged as disclosed in the specification accompanying our co-pending patent application Serial No. 252,486, filed 23rd January 1939, with which the possibility of "blow-back" occurring is effectively prevented. Each burner unit extends over substantially the whole width of the side wall of the chamber.

When the burner units are lit the heated gases emanating therefrom pass up outside the two side walls of the chamber and then over a portion or the whole of the top wall of the chamber, whence they are led down outside the back of the chamber, the chamber and casing jointly providing the necessary heating passages. They are then taken underneath the chamber in contact with the bottom wall thereof towards the front of the chamber. For this purpose a partition 31 is provided below the chamber spaced below the bottom thereof. Beneath this partition is the bottom wall 32 of the casing over which the gases finally pass rearwardly to an outlet 33 at the rear. The arrows denote the direction of the gas flow.

The control taps for the gas may be disposed wherever desired and any suitable provision may be made for the lighting of the burner units. For example, each burner unit may be disposed in the interior of a hollow cylinder 36 having a relatively-large slot 37 along its upper edge through which the burning gases from the individual burners emanate. In Figure 5 the cylinder is shown as being rotatably mounted so that it can be turned about its axis to bring the slot 37 to the outside of the casing to allow of the burner units being lit, after which it can be turned back into the operative position. To facilitate the turning of the cylinder, the latter carries a handle 38.

In the construction of Figures 1 to 4, however, the cylinder 36 is shown as being fixed in position and provided with a second longitudinal slot 39 which is normally closed by an oscillatable shutter 40. To light a burner unit the shutter 40 can be swung upwardly by means of a handle 41 and ignition then effected through the opening 42 in the casing and the slot 39. A further longitudinal slot 43, which is permanently open, is provided along the base of the cylinder for supplying air for the burners 30.

Figure 6:
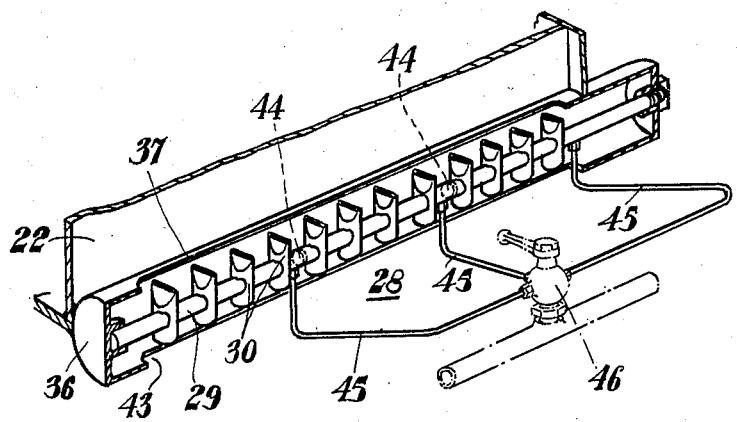
Figure 6 is a sectional perspective view of one form of burner and control therefor for use in a gas cooker according to the invention.

Figure 6 illustrates a burner unit having baffles 44 in the pipe 29 to divide it into three parts. Each of these is provided with a supply pipe 45, 46 representing a control cock whereby one, two or all three of the parts can be selectively supplied at will dependent upon the heating effect required.

In the modification of Figure 5, 49 represents the oven chamber, 50 the lagged casing spaced therefrom, and 51 a single burner unit outside the lower edge of one side of the chamber. The gas flow in this case is along the outside of the adjacent side wall 52 of the chamber, across the top thereof, down the outside of the opposite side wall, beneath the bottom wall thereof, up along the outside of the back wall thereof, and out by the outlet 53 as indicated by the arrows. This is rendered possible by causing the back wall of the chamber to extend laterally at each side, as shown at 54, to the side walls of the casing and to extend upwardly, as at 55, to the top wall of the casing.

In this way the burning gases are prevented from coming into contact with any foodstuff which is being cooked in the oven and a very even distribution of heat is ensured.

It is to be understood that the sizes and arrangement of the various passages is such that an even flow of the gases, without any throttling effect, will take place.

What we claim as our invention and desire to secure by Letters Patent of the United States is:

A gas oven comprising, a body portion having side, back, top and bottom walls and a door closing the front of the body portion, a casing enclosing and spaced from said walls of the body portion and closed about the front thereof, the side walls of the body portion extending below the bottom wall thereof to support the body portion in raised position in the casing and provide a bottom flue beneath the body portion opening rearwardly therebeneath and to provide lateral flues between the casing and the said side walls of the body portion, the top and back walls of the body portion and the adjacent spaced portions of the casing providing intercommunicating top and back flues, the back wall of the body portion extending laterally from opposite sides thereof to the casing to close the lateral flues from the back flue throughout the height of the body portion, said casing having an outlet opening in its back wall near the lower end thereof, a partition extending forwardly from the upper edge of the opening partway into said bottom flue to direct products of combustion from the back flue forwardly along the bottom of the body portion and then backwardly beneath the partition through said outlet opening in the back of the casing, and burners disposed in the lower ends of the lateral flues.

JOHN ERNEST NEALE.
ALBERT GUEST.